Aug. 9, 1932.  M. L. BEISTLE  1,870,766
CAMERA MOUNTING
Filed May 31, 1930   2 Sheets-Sheet 1
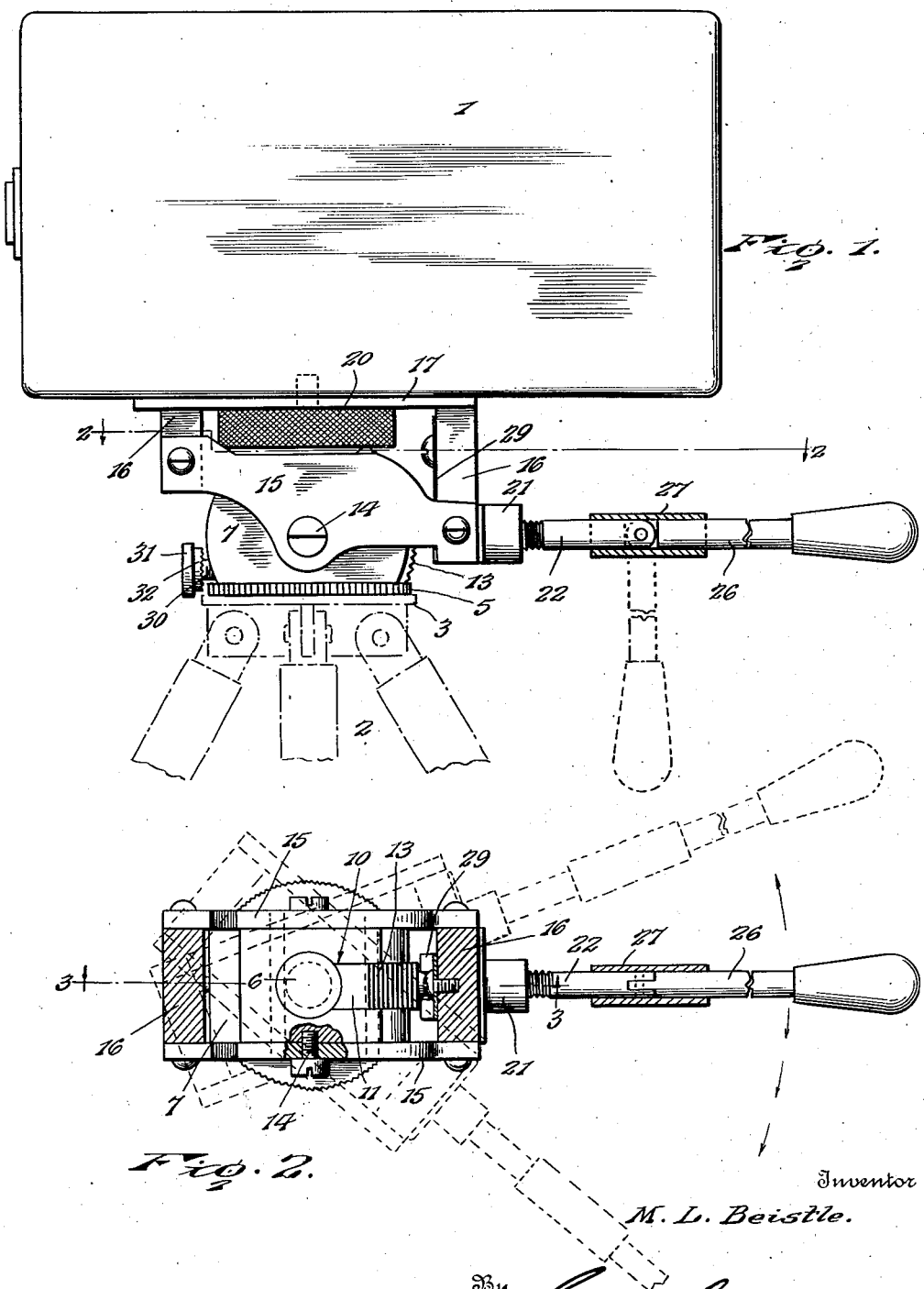
Inventor
M. L. Beistle.
By Lacey & Lacey,
Attorneys Aug. 9, 1932.   M. L. BEISTLE   1,870,766
CAMERA MOUNTING
Filed May 31, 1930   2 Sheets-Sheet 2
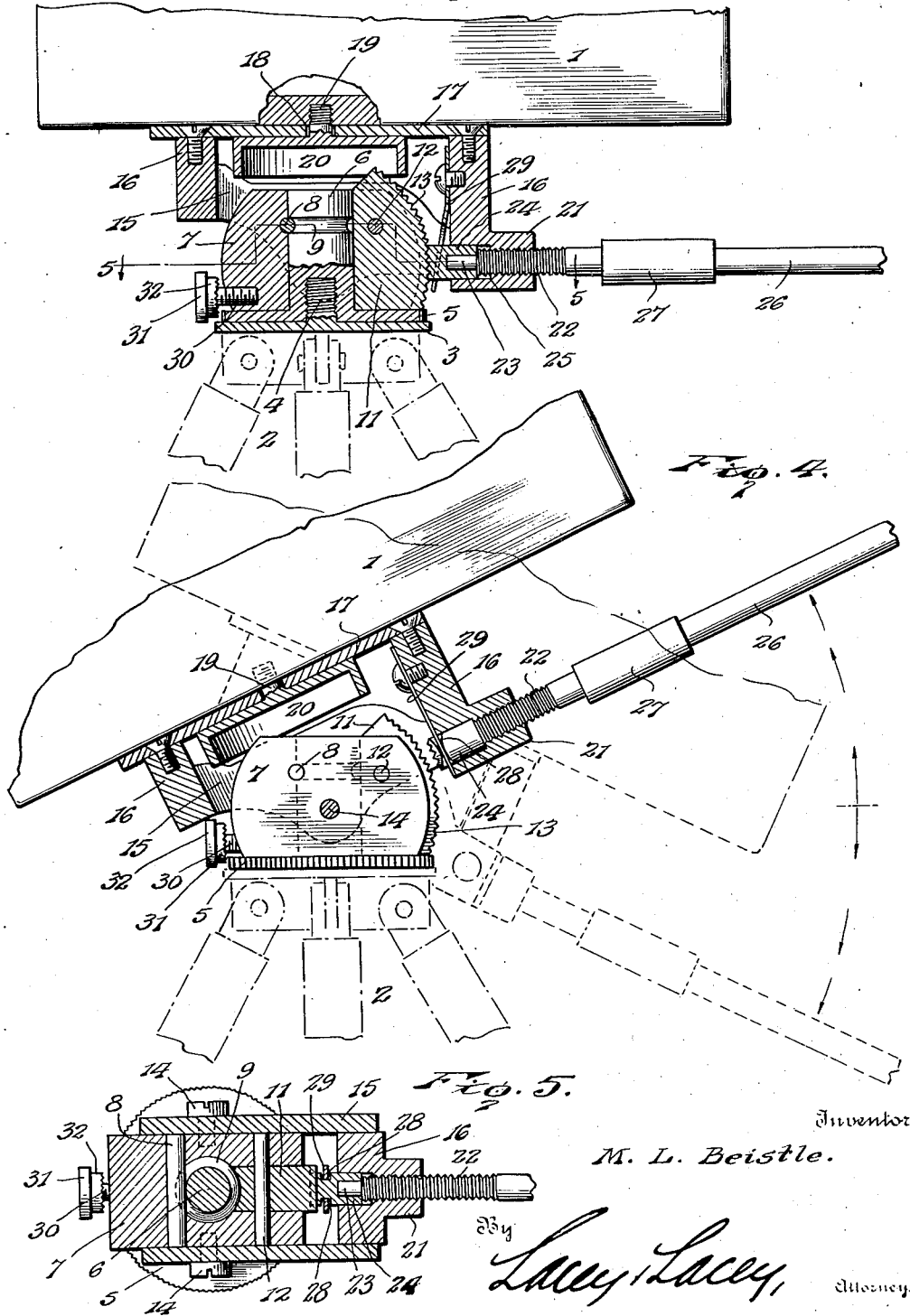

Patented Aug. 9, 1932

1,870,766

UNITED STATES PATENT OFFICE

MARTIN L. BEISTLE, OF SHIPPENSBURG, PENNSYLVANIA

CAMERA MOUNTING

Application filed May 31, 1930. Serial No. 458,631.

This invention is a mounting for cameras or other machines or objects and has for its object the provision of a simple, compact and easily operable device whereby a camera or other object to be supported may be tilted in a vertical plane or turned in a horizontal plane and may be locked in any desired set position or be held against movement in one plane while turnable in another plane. Other objects of the invention will appear in the course of the following description, and the invention resides in certain novel features which will be particularly pointed out in the appended claims.

In the accompanying drawings which illustrate one embodiment of the invention:

Figure 1 is a side elevation of the device having a camera mounted thereon,

Fig. 2 is a horizontal section on the line 2—2 of Fig. 1,

Fig. 3 is a longitudinal section on the line 3—3 of Fig. 2,

Fig. 4 is a view similar to Fig. 3 but showing the device in a different position, and Fig. 5 is a detail section on the line 5—5 of Fig. 3.

In the drawings, there is indicated conventionally at 1 a camera which may be of any known or approved form and at 2 is indicated a tripod of any approved design, said tripod including a cap plate 3 having a threaded stud 4 rising centrally therefrom. In carrying out the present invention, there is provided a base member or plate 5, preferably circular with a milled edge, having a post 6 rising centrally therefrom, said post having a threaded socket in its lower end, as shown clearly in Fig. 3, to engage the stud 4 whereby the base member will be firmly secured on the tripod, and it will be noted that the post projects appreciably above the cap plate and the stud 4 so that parts mounted on the post will be accommodated and the camera will be disposed at a greater height relative to the tripod than has been heretofore customary. Fitted upon the post 6 and resting on the base plate 5 is a body 7 through which is inserted a transverse locking pin or key 8 to engage an annular groove 9 in the post whereby the body will be swiveled upon the post and may turn about the same but cannot rise therefrom unless the pin be withdrawn. The body 7 consists of a block having flat sides, as will be best understood upon reference to Figs. 1 and 2, and having its ends arcuate so as to present convex surfaces to accommodate the swinging of the camera in a vertical plane, as will presently more fully appear. In one end of the body block 7 is formed a radial recess or notch 10 and disposed within said recess or notch is a locking block 11 which is pivotally retained within the recess by a transverse pin 12 inserted through the sides of the body and through the block, as shown in Figs. 3, 4 and 5. The outer edge of the block 11 is provided with teeth or corrugations 13, the purpose of which will presently appear. Pivoted upon the sides of the body 7, as shown at 14, are side plates 15 and disposed between and secured to the ends of the side plates are cross bars or hangers 16, upon the upper ends of which is secured a plate or bar 17 which is adapted to bear against the bottom of the camera and support the same, the arcuate edges of the body 7 and locking block 11 being concentric with the pivot points 14. The bar or plate 17 is provided with an opening 18 therethrough midway its ends and a threaded stud 19 is inserted through said opening to engage a socket in the bottom of the camera whereby to secure the camera firmly on the supporting bar or plate. The stud 19 is formed integral with the upper side of a head 20, the periphery of which is knurled and which head is disposed between the supporting plate 17 and the top of the body 7 whereby when the milled head is turned the plate or bar 17 will be firmly clamped between the head and the bottom of the camera so that the camera will be strongly secured upon the plate. As best shown in Fig. 1, the side plates 15 are so shaped as to avoid interference with the base in the vertical tilting of the device. The rear hanger or cross bar 16 is provided with a tubular extension 21 at its lower end and in this extension is threaded a shank 22 which is provided at its forward end with a tenon 23 engaging in a mortise in the outer end of a locking dog 24 which is slidably mounted in a socket 25 in the lower end of the cross bar 16, as clearly shown in Fig. 3, the forward end of the dog being corrugated or provided with teeth adapted to engage the teeth 13 of the block 11 so that the side plates and the parts carried thereby may be held in a set relation to the block and the body 7. The shank 22 constitutes the forward member of a handle, the rear member 26 of which is pivoted to the shank 22 so that it may be arranged in alinement therewith or disposed at an angle thereto. When the two parts are alined, a coupling sleeve 27 is slid over the joint between them so as to maintain them rigidly alined to permit manipulation and adjustment of the device. When the device is once adjusted in the desired position, the coupling sleeve may be slid from over the joint and the outer section 26 permitted to fold downwardly, as indicated by the dotted lines in Fig. 1, thereby being disposed out of the way of the photographer or other operator. This construction also is advantageous when the device is to be stored. The dog 24 is provided with grooves 28 in its outer surface and a leaf spring 29 is secured to the forward side of the hanger 16 and has its lower end forked and engaged in said grooves, as clearly shown in the drawings. This spring tends constantly to press the dog out of engagement with the block 11 and thereby maintains the engagement of the dog with the shank 22 and also effects a quick release of the dog from the locking position when the adjustment of the device is to be changed. Fitted in the forward end of the body block 7 is a lock screw 30, the head 31 of which is knurled and around the stem of which is a shoulder 32 may be caused to bind against the edge of the base plate 5 and thereby hold the body or block 7 against horizontal pivotal movement about the post 6.

From the foregoing description, taken in connection with the accompanying drawings, it will be seen that I have provided a very simple and compact device whereby a camera or other object will be firmly supported and which may be readily manipulated and adjusted to set the camera at any desired angle to the vertical and also shifted to any desired position in a horizontal plane. When the screw 30 is so adjusted that its head 31 is out of contact with the peripheral edge of the base 5, the entire device may be swung pivotally about the post 6 in a horizontal plane and if the screw be then manipulated so as to cause its shoulder 32 to bind against the edge of the base 5 the device will be held in the set position firmly, as will be understood. This arrangement will permit the user of the device to set his camera so as to view an object or scene at an angle which is most convenient or advantageous, but if the lock screw be left out of engagement with the base, the operator may take a panoramic picture which is accomplished by shifting the camera from one side to another side while making exposures. The support is, of course, shifted by manipulating the handle member and by raising or lowering the handle member the camera may be shifted pivotally in a vertical plane about the pivotal centers 14, thereby tilting the camera to a desired angle. Very often it is desired to photograph an object or a scene or an action, the center of which is somewhat above the plane in which the camera may be conveniently disposed, and under such conditions it is very desirable to tilt the camera so as to get the proper focus upon the object or scene. When the proper inclination of the camera has been attained, the handle member is rotated so that the threaded shank 22 will ride inwardly through the tubular extension 21 and thereby force the dog 24 inwardly against the action of the spring 29 to engage the lock 13 and thereby hold the camera in the inclined position in which it has been set. It will also be noted that a slight pivotal movement may be imparted to the lock by this action so that the lock will bind against the post 6 and thereby hold the camera in a set position in a horizontal plane. If the handle be rotated in the reverse direction, the spring 29 will at once free the dog from the lock so that the camera may be disposed in some other adjustment. It will thus be seen that the camera may be disposed in a horizontal position and also at any desired angle in a horizontal plane and it may be disposed in a tilted position and when locked in said tilted position may still be shifted in a horizontal plane so that it will be adapted for taking panoramic photographs either above or below the horizontal plane of the body block or main support 7. These various adjustments are illustrated by the full and dotted lines in Fig. 4 and also by the full and dotted lines in Fig. 2. The camera may be adjusted both vertically and horizontally by one hand manipulating the handle, leaving the other hand free to operate the mechanism of the camera. Pressure applied through the handle causes the dog 24 to lock with the block 11 to hold the camera in vertical adjustment and may also force said block 11 into frictional engagement with the post to resist horizontal movement.

While the device is intended primarily for use in mounting cameras and particularly cameras for taking moving pictures, its usefulness is not confined to the photographic field as it may be employed for mounting machine guns, surveyors' instruments and other objects.

Having thus described the invention, I claim:

1. A mounting comprising a base adapted to be secured upon a fixed support and including a central post, a main body swiveled upon said post and having a recess in one end, an object-carrying frame pivotally mounted upon the body for tilting movement in a vertical plane, a locking member mounted in the recess in the body, a dog mounted in the frame to engage said locking member, and means for shifting the dog into or out of engagement with the locking member.

2. A mounting for the purpose set forth comprising a base member, a main body swiveled upon the base member for turning movement in a horizontal plane, an object-carrying frame pivotally mounted upon the main body for tilting movement in a vertical plane, a locking member seated in the main body and disposed within the frame, a dog mounted in the frame, a handle member mounted in the frame and engaged with the dog to shift the dog into engagement with the locking member to hold the frame in a set position, and means mounted on the frame and engaged with the dog for yieldably holding the dog out of engagement with the locking member.

3. In a mounting, a base, a main body swiveled upon the base, an object-carrying frame pivotally mounted upon the base, a locking member fitted in the base, a dog slidably mounted in the frame and adapted to engage the locking member, a shank threaded in the frame and engaged with the dog for shifting the same toward the locking member, an outer handle section pivoted to the shank, a coupling sleeve adapted to fit over the joint between the shank and said handle member whereby to hold them in axial alinement, and means mounted on the frame and engaged with the dog to withdraw the same from the locking member.

In testimony whereof I affix my signature.

MARTIN L. BEISTLE. [L. S.]